US008885946B2

(12) United States Patent
Chang et al.

(10) Patent No.: US 8,885,946 B2
(45) Date of Patent: Nov. 11, 2014

(54) COMPUTING DEVICE AND METHOD OF DETERMINING BORDER POINTS FOR MEASURING IMAGES OF OBJECTS

(71) Applicants: Hong Fu Jin Precision Industry (ShenZhen) Co., Ltd., Shenzhen (CN); Hon Hai Precision Industry Co., Ltd., New Taipei (TW)

(72) Inventors: Chih-Kuang Chang, New Taipei (TW); Li Jiang, Shenzhen (CN); Zhong-Kui Yuan, Shenzhen (CN); Zhi-Jun Zou, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 28 days.

(21) Appl. No.: 13/749,710

(22) Filed: Jan. 25, 2013

(65) Prior Publication Data
US 2013/0223761 A1    Aug. 29, 2013

(30) Foreign Application Priority Data

Feb. 29, 2012  (CN) .......................... 2012 1 0049032

(51) Int. Cl.
*G06K 9/46* (2006.01)
*G06T 7/00* (2006.01)
*G06T 7/60* (2006.01)

(52) U.S. Cl.
CPC ................. *G06T 7/60* (2013.01); *G06T 7/0085* (2013.01); *G06T 2207/20136* (2013.01)
USPC ........................................... 382/199; 382/173

(58) Field of Classification Search
None
See application file for complete search history.

(56) References Cited

U.S. PATENT DOCUMENTS

| 5,081,689 | A | * | 1/1992 | Meyer et al. ................... 382/199 |
| 5,748,778 | A | * | 5/1998 | Onoguchi ....................... 382/199 |
| 5,987,172 | A | * | 11/1999 | Michael ......................... 382/199 |
| 7,003,161 | B2 | * | 2/2006 | Tessadro ........................ 382/199 |
| 7,567,713 | B2 | * | 7/2009 | Ding .............................. 382/199 |
| 2007/0003158 | A1 | * | 1/2007 | Chang et al. .................. 382/275 |
| 2010/0104198 | A1 | * | 4/2010 | Chang et al. .................. 382/199 |

\* cited by examiner

*Primary Examiner* — Li Liu
(74) *Attorney, Agent, or Firm* — Novak Druce Connolly Bove + Quigg LLP

(57) ABSTRACT

In a method of determining border points for measuring an image of an object using a computing device, grayscale values of pixel points in an image being measured are acquired, and definition values of the pixel points are computed according to the grayscale values. A line which intersects with the image being measured is constructed, and the definition values of the pixel point values in the lines are obtained. A location range of a border point of the image being measured is determined according to the definition values of the pixel point values in the line, and the border point is selected from the location range. A border line of the image being measured is fitted using the border points.

15 Claims, 7 Drawing Sheets

COMPUTING DEVICE AND METHOD OF DETERMINING BORDER POINTS FOR MEASURING IMAGES OF OBJECTS

BACKGROUND

1. Technical Field

Embodiments of the present disclosure relate to image measuring technique, and more particularly to a computing device and a method of determining border points for measuring an image of an object.

2. Description of Related Art

Image measuring technique is widely used in precision measurement field for precisely, accurately, and speedily measuring elements, such as, points, lines, planes, and circles, on a measured image of an object. The measurements of the elements include measuring coordinates of the points, measuring line widths of the lines, and measuring circular degrees of the circle, for example.

When measuring the elements using an image measuring software, the image measuring software determines border lines of the elements, fits the elements according to the border lines, and measures the fitted elements. If border lines of the elements on the measured image are unclear, the image measuring software may not determine the border lines, thus, it is difficult to fit and measure the elements.

DETAILED DESCRIPTION

In general, the word "module," as used hereinafter, refers to logic embodied in hardware or firmware, or to a collection of software instructions, written in a programming language, such as, for example, Java, C, or Assembly. One or more software instructions in the modules may be embedded in firmware. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
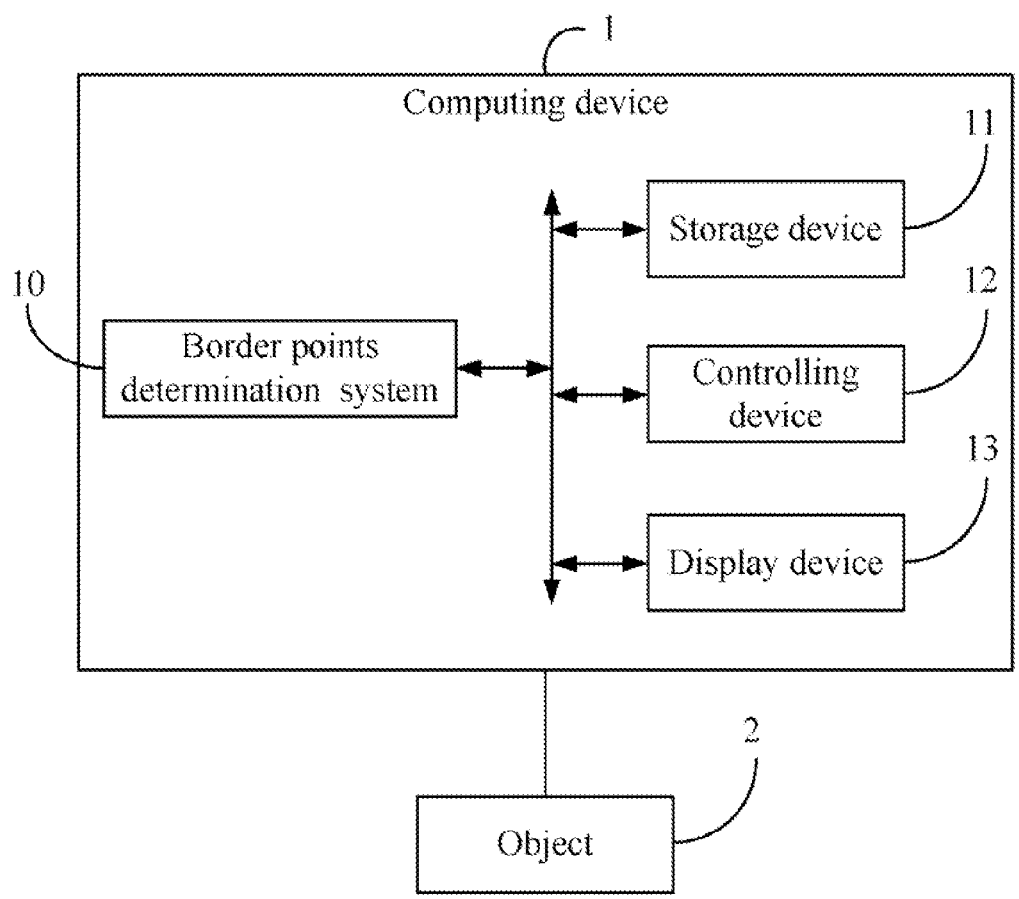
FIG. 1 is a block diagram of one embodiment of a computing device including a border points determination system.

FIG. 1 is a block diagram of one embodiment of a computing device 1 including a border points determination system 10. The computing device 1 may be a computer, a server, or a personal digital assistant (PDA), for example. The computing device 1 further includes a storage device 11, a controlling device 12, and a display device 13. One skilled in the art would recognize that the computing device 1 may be configured in a number of other ways and may include other or different components.

The border points determination system 10 includes computerized codes in the form of one or more programs, which are stored in the storage device 11. In present embodiment, the one or more programs of the border points determination system 10 are described in the form of function modules (see FIG. 2), which have functions of determining border points of an image being measured of an object 2, when executed by the controlling device 12.

The storage device 11 may include some type(s) of non-transitory computer-readable storage mediums, such as a hard disk drive, a compact disc, a digital video disc, or a tape drive.

The controlling device 12 may be a processor, a microprocessor, an application-specific integrated circuit (ASIC), and a field programmable gate array, (FPGA) for example.

Figure 2:
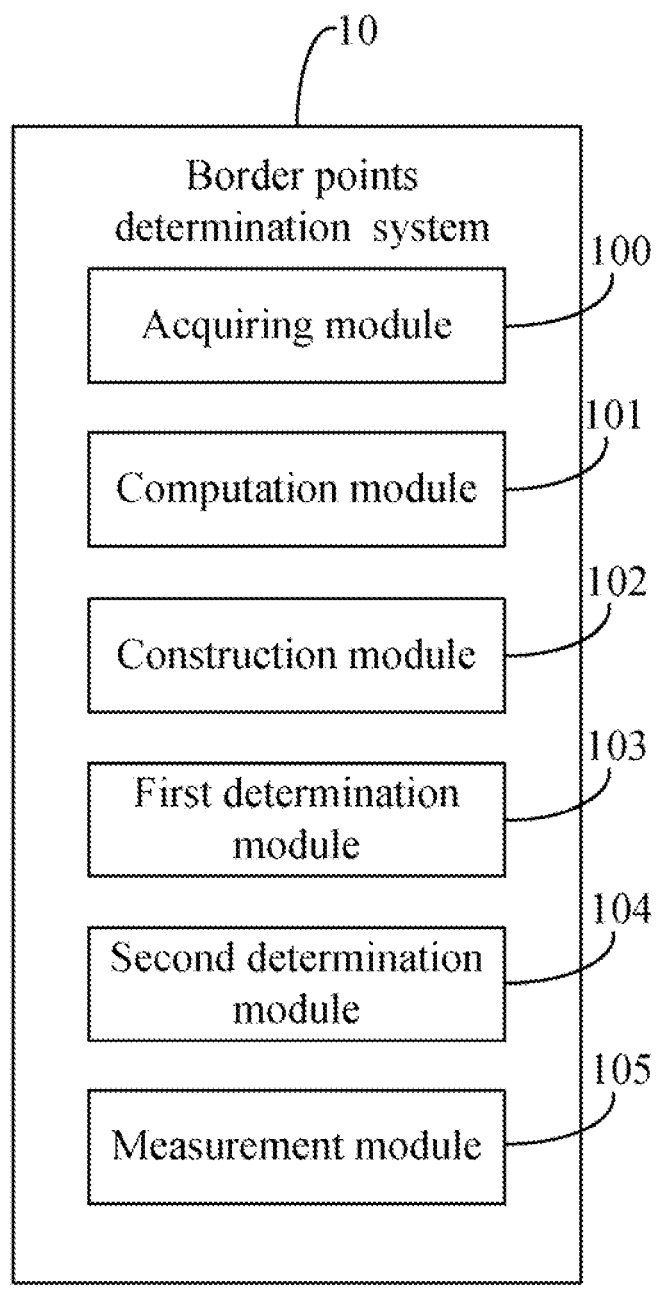
FIG. 2 is a block diagram of one embodiment of function modules of the border points determination system in FIG. 1.

FIG. 2 is a block diagram of one embodiment of function modules of the border points determination system 10 in FIG. 1. In one embodiment, the border points determination system 10 may include an acquiring module 100, a computation module 101, a construction module 102, a first determination module 103, a second determination module 104, and a measurement module 105. The function modules 100 to 105 provide at least the functions needed to execute the steps illustrated in FIG. 3, FIG. 4, and FIG. 6 below.

Figure 3:
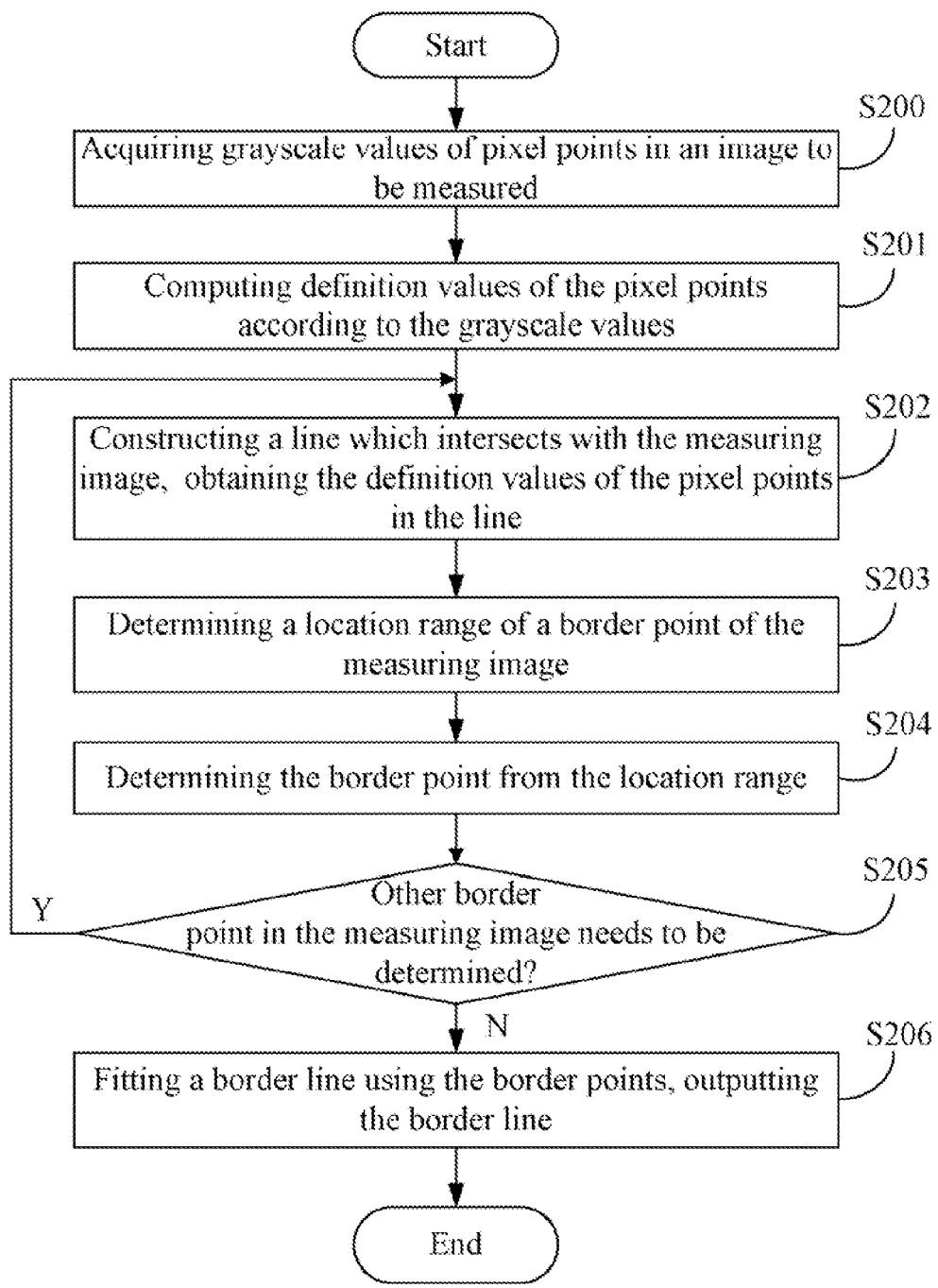
FIG. 3 is a flowchart of one embodiment of a method for determining border points of measuring an image of an object.

FIG. 3 is a flowchart of one embodiment of a method for determining border points for measuring an image of the object 2. Depending on the embodiment, additional steps may be added, others removed, and the ordering of the steps may be changed.

In step S200, the acquiring module 100 acquires grayscale values of pixel points in the image being measured of the object 2. The image being measured of the object may be pre-stored in the storage device 11, or can be obtained by an image capturing device which is installed in the computing device 1 or is externally connected to the computing device 1.

In step S201, the computation module 101 computes definition values of the pixel points according to the grayscale values. In one embodiment, the definition value of a pixel point P is computed as follows: constructing a rectangle, which is centered at the pixel point P and contains n*n pixel points, wherein n is an odd number except 1; computing a difference value of the grayscale values of the pixel point P and each of the other (n−1) pixel points; and computing a sum of absolute values of the difference values to gain the definition value of the pixel point P.

In step S202, the construction module 102 constructs a line which intersects with the image being measured, and obtains the definition values of the pixel point values in the lines.

Figure 4:
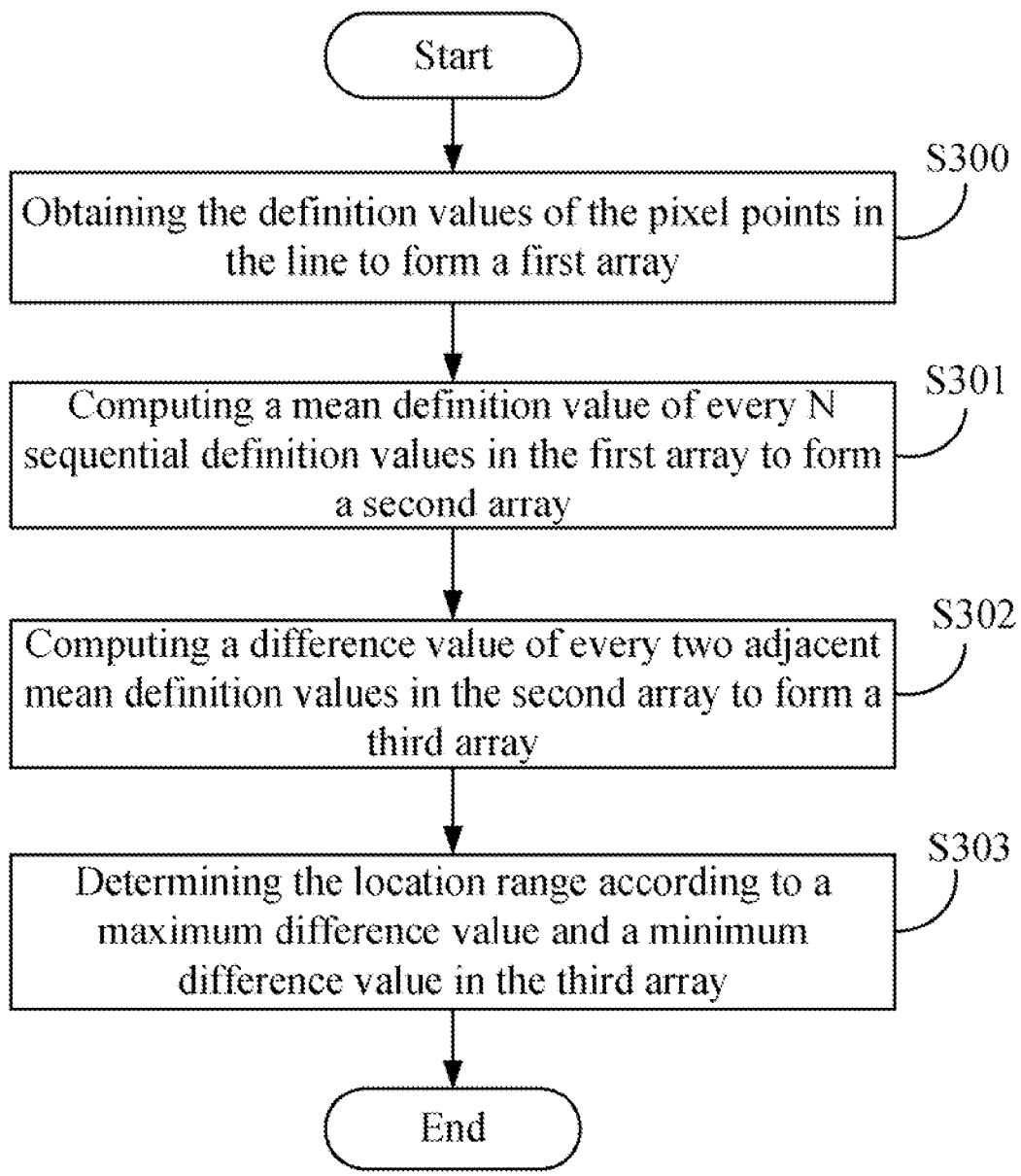
FIG. 4 is a flowchart of detailed description of step S203 in FIG. 3.

In step S203, the first determination module 103 determines a location range of a border point of the image being measured using the definition values of the pixel points in the line. The detailed description of step S203 is illustrated in FIG. 4 below.

Figure 6:
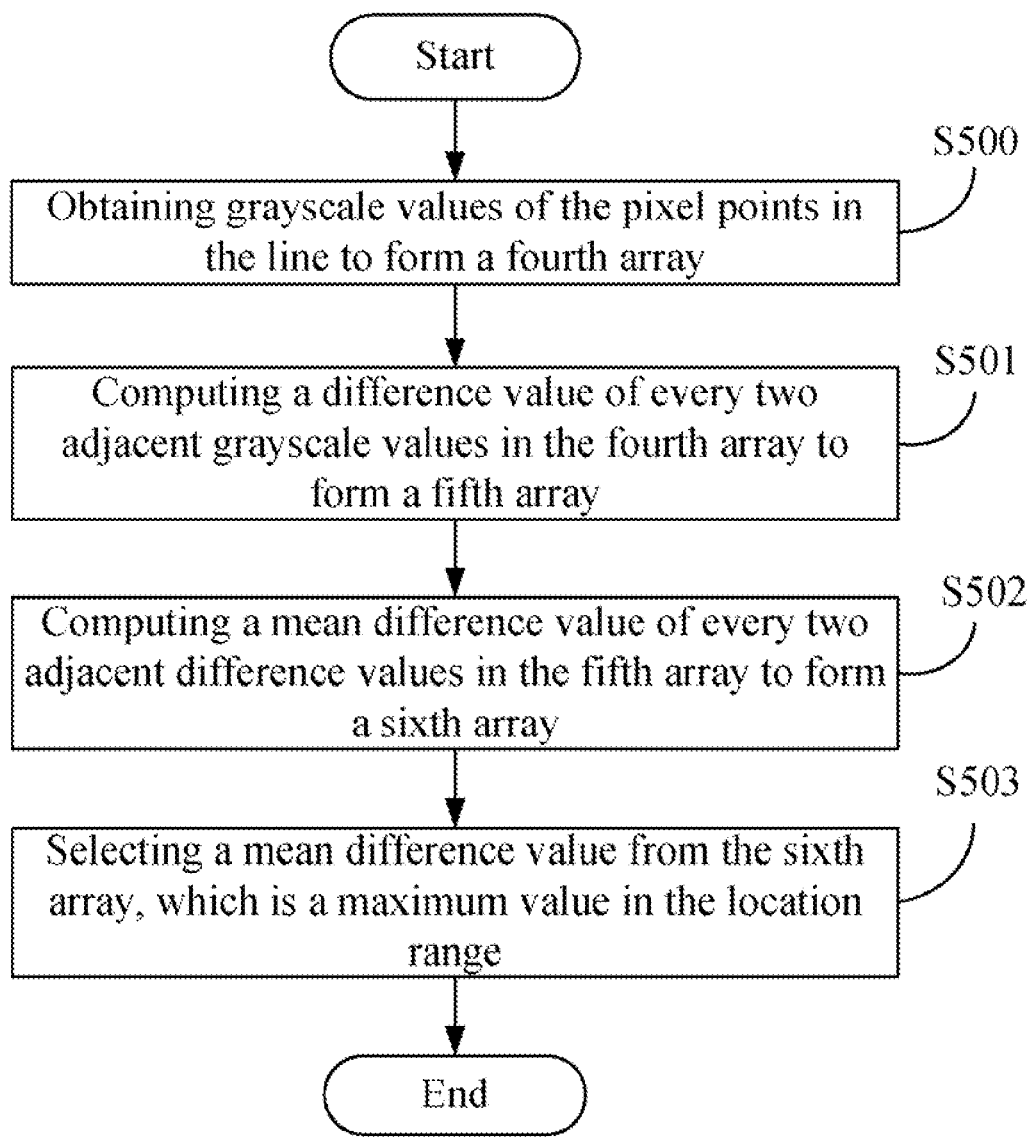
FIG. 6 is a flowchart of detailed description of step S204 in FIG. 3.

In step S204, the second determination module 104 determines the border point from the location range. The detailed description of step S204 is illustrated in FIG. 6 below.

In step S205, the measurement module 105 determines if other border point in the image being measured needs to be determined. If other border point needs to be determined, the process goes to step S202. Otherwise, step S206 is implemented.

In step S206, the measurement module 105 fits a border line of the image being measured using the border points, and outputs the border line to the display device 13.

FIG. 4 is a flowchart of detailed description of step S203 in FIG. 3. Depending on the embodiment, additional steps may be added, others removed, and the ordering of the steps may be changed.

In step S300, the first determination module 103 obtains the definition values of the pixel points in the line to form a first array.

In step S301, the first determination module 103 computes a mean definition value of every N sequential definition values in the first array to form a second array, wherein N is an odd number except 1, for example 3.

In step S302, the first determination module 103 computes a difference value of every two adjacent mean definition values in the second array to form a third array.

Figure 5:
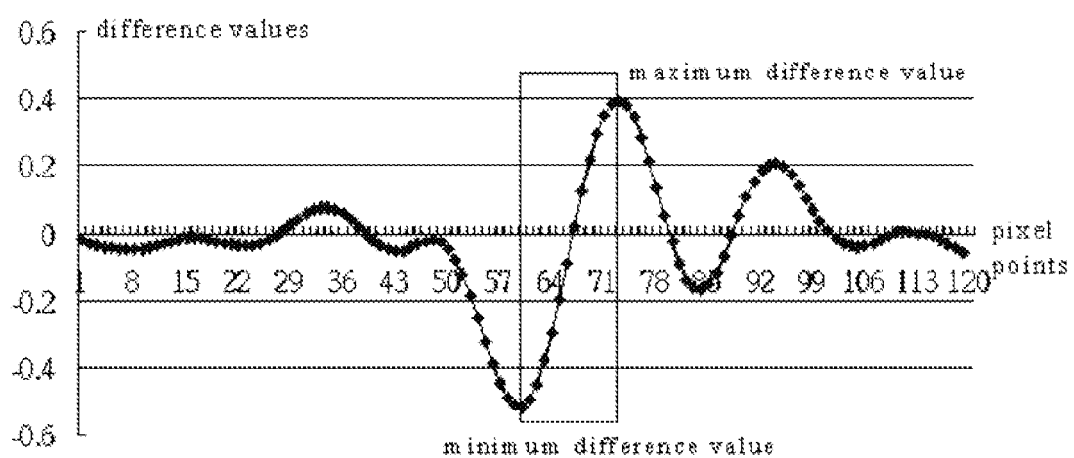
FIG. 5 is a graph of determining a location range of a border point.

In step S303, the first determination module 103 determines the location range according to a maximum difference value and a minimum difference value in the third array. For example, referring to FIG. 5, the location range is a value range from a pixel point corresponding to the maximum difference value and a pixel point corresponding to the minimum difference value.

FIG. 6 is a flowchart of detailed description of step S204 in FIG. 3. Depending on the embodiment, additional steps may be added, others removed, and the ordering of the steps may be changed.

In step S500, the second determination module 104 obtains the grayscale values of the pixel points in the line to form a fourth array.

In step S501, the second determination module 104 computes a difference value of every two adjacent grayscale values in the fourth array to form a fifth array.

In step S502, the second determination module 104 computes a mean difference value of every two adjacent difference grayscale values in the fifth array to form a sixth array.

Figure 7:
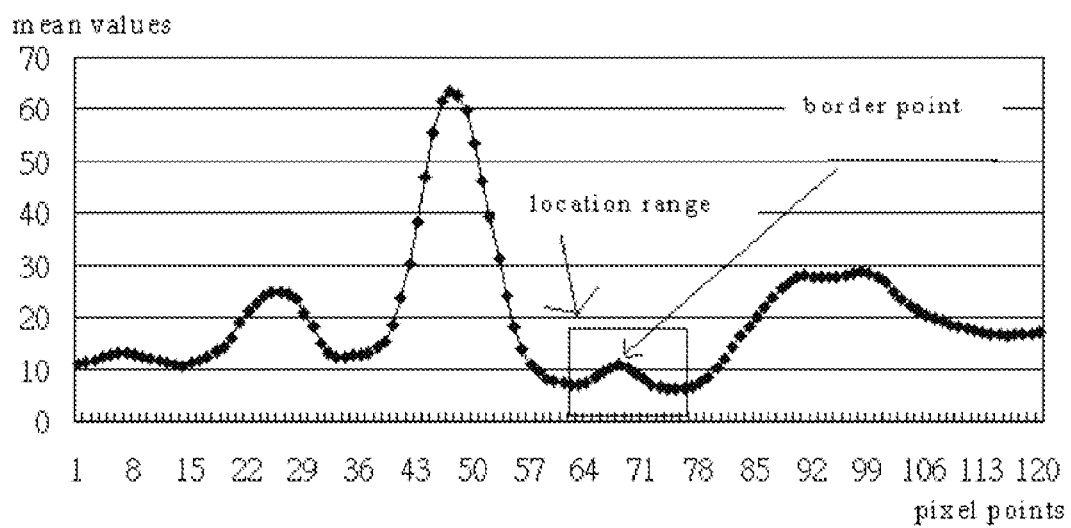
FIG. 7 is a graph of determining a border point.

In step S503, the second determination module 104 selects a mean difference value from the sixth array, which is a maximum value in the location range, such as the example illustrated in FIG. 7, and determines that the pixel point corresponding to the selected mean difference value is the border point. In FIG. 7, the curve in the box represents a location range, and the peak in the location range is a border point.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A computerized method of determining border points for measuring an image of an object, the method being executed by at least one processor of a computing device and comprising:

(a) acquiring grayscale values of pixel points in the image being measured by the at least one processor;

(b) computing definition values of the pixel points according to the grayscale values by the at least one processor;

(c) constructing a line which intersects with the image being measured, and obtaining the definition values of the pixel point values in the lines by the at least one processor;

(d) determining a location range of a border point of the image being measured using the definition values of the pixel point values in the line by the at least one processor;

(e) determining the border point from the location range by the at least one processor;

(f) repeating step (c) to (e) until all border points of the image being measured has been determined by the at least one processor; and (g) fitting a border line of the image being measured using the border points, and outputting the border line by the at least one processor, wherein step (e) comprises:

obtaining the grayscale values of the pixel points in the line to form a fourth array by the at least one processor;

computing a difference value of every two adjacent values in the fourth array to form a fifth array by the at least one processor;

computing a mean difference value of every two adjacent difference values in the fifth array to form a sixth array by the at least one processor; and selecting a mean difference value from the sixth array, which is a maximum value in the location range, and determining that the pixel point corresponding to the selected mean difference value is the border point by the at least one processor.

2. The method according to claim 1, wherein the definition value of a pixel point P in the image being measured is computed by:

constructing a rectangle, which is centered at the pixel point P and contains n*n pixel points;

computing a difference value of the grayscale values of the pixel point P and each of the other (n−1) pixel points; and computing a sum of absolute values of the difference values to gain the definition value of the pixel point P.

3. The method according to claim 2, wherein n is an odd number except 1.

4. The method according to claim 1, wherein step (d) comprises:

obtaining the definition values of the pixel points in the line to form a first array by the at least one processor;

computing a mean definition value of every N sequential definition values in the first array to form a second array by the at least one processor;

computing a difference value of every two adjacent mean definition values in the second array to form a third array by the at least one processor; and determining the location range according to a maximum difference value and a minimum difference value in the third array by the at least one processor.

5. The method according to claim 4, wherein N is an odd number except 1.

6. A computing device, comprising:

a storage device;

at least one processor; and one or more modules that are stored in the storage device, and are executed by the at least one processor, the one or more modules comprising instructions to:

acquire grayscale values of pixel points in an image being measured of an object;

compute definition values of the pixel points according to the grayscale values;

construct a line which intersects with the image being measured, and obtain the definition values of the pixel point values in the lines;

determine a location range of a border point of the image being measured using the definition values of the pixel point values in the line;

determine the border point from the location range; and fit a border line of the image being measured using the border points, and output the border line, wherein the border point is determined by:

obtaining the grayscale values of the pixel points in the line to form a fourth array;

computing a difference value of every two adjacent values in the fourth array to form a fifth array;

computing a mean difference value of every two adjacent difference value values in the fifth array to form a sixth array; and selecting a mean difference value from the sixth array, which is a maximum value in the location range, and determining that the pixel point corresponding to the selected difference mean value is the border point.

7. The computing device according to claim 6, wherein the definition value of a pixel point P in the image being measured is computed by:

constructing a rectangle, which is centered at the pixel point P and contains n*n pixel points;

computing a difference value of the grayscale values of the pixel point P and each of the other (n−1) pixel points; and computing a sum of absolute values of the difference values to gain the definition value of the pixel point P.

8. The computing device according to claim 7, wherein n is an odd number except 1.

9. The computing device according to claim 6, wherein the location range of is determined by:

obtaining the definition values of the pixel points in the line to form a first array;

computing a mean definition value of every N sequential definition values in the first array to form a second array;

computing a difference value of every two adjacent mean definition values in the second array to form a third array; and determining the location range according to a maximum difference value and a minimum difference value in the third array.

10. The computing device according to claim 9, wherein N is an odd number except 1.

11. A non-transitory storage medium having stored thereon instructions that, when executed by a processor of a computing device, causes the processor to perform a method of determining border points for an image being measured of an object, wherein the method comprises:

(a) acquiring grayscale values of pixel points in the image being measured;

(b) computing definition values of the pixel points according to the grayscale values;

(c) constructing a line which intersects with the image being measured, and obtaining the definition values of the pixel point values in the lines;

(d) determining a location range of a border point of the image being measured using the definition values of the pixel point values in the line;

(e) determining the border point from the location range;

(f) repeating step (c) to (e) until all border points of the image being measured has been determined; and (g) fitting a border line of the image being measured using the border points, and outputting the border line, wherein step (e) comprises:

obtaining the grayscale values of the pixel points in the line to form a fourth array;

computing a difference value of every two adjacent values in the fourth array to form a fifth array;

computing a mean difference value of every two adjacent difference value values in the fifth array to form a sixth array; and selecting a mean difference value from the sixth array, which is a maximum value in the location range, and determining that the pixel point corresponding to the selected mean difference value is the border point.

12. The non-transitory storage medium according to claim 11, wherein the definition value of a pixel point P in the image being measured is computed by:

constructing a rectangle, which is centered at the pixel point P and contains n*n pixel points;

computing a difference value of the grayscale values of the pixel point P and each of the other (n−1) pixel points; and computing a sum of absolute values of the difference values to gain the definition value of the pixel point P.

13. The non-transitory storage medium according to claim 12, wherein n is an odd number except 1.

14. The non-transitory storage medium according to claim 11, wherein step (d) comprises:

obtaining the definition values of the pixel points in the line to form a first array;

computing a mean definition value of every N sequential definition values in the first array to form a second array;

computing a difference value of every two adjacent mean definition values in the second array to form a third array; and determining the location range according to a maximum difference value and a minimum difference value in the third array.

15. The non-transitory storage medium according to claim 14, wherein N is an odd number except 1.

* * * * *